(12) United States Patent
Bojanowski et al.

(10) Patent No.: US 9,415,666 B2
(45) Date of Patent: Aug. 16, 2016

(54) METHOD FOR COUPLING A SUNROOF ASSEMBLY TO A STRUCTURAL FRAME OF A VEHICLE

(71) Applicant: GM GLOBAL TECHNOLOGY OPERATIONS LLC, Detroit, MI (US)

(72) Inventors: Gerald M. Bojanowski, Washington Township, MI (US); James A. Forbes, Ortonville, MI (US); Craig D. Schroeder, Wyandotte, MI (US)

(73) Assignee: GM Global Technology Operations LLC, Detroit, MI (US)

(*) Notice: Subject to any disclaimer, the term of this patent is extended or adjusted under 35 U.S.C. 154(b) by 119 days.

(21) Appl. No.: 14/527,046

(22) Filed: Oct. 29, 2014

(65) Prior Publication Data

US 2016/0121702 A1 May 5, 2016

(51) Int. Cl.
*B60J 7/043* (2006.01)
*B60J 7/047* (2006.01)
*B62D 65/02* (2006.01)
*B21D 53/88* (2006.01)
*B62D 65/06* (2006.01)

(52) U.S. Cl.
CPC .............. *B60J 7/047* (2013.01); *B21D 53/88* (2013.01); *B60J 7/043* (2013.01); *B62D 65/026* (2013.01); *B23P 2700/50* (2013.01); *B62D 65/06* (2013.01); *Y10T 29/4978* (2015.01); *Y10T 29/49778* (2015.01)

(58) Field of Classification Search
CPC ............ Y10T 29/4978; Y10T 29/49778; Y10T 29/49895; Y10T 29/49963; Y10T 29/49947; B21D 53/88; B23P 2700/50; B60J 7/043; B62D 65/026; B62D 65/06; B23Q 3/186; B23Q 3/183
See application file for complete search history.

(56) References Cited

U.S. PATENT DOCUMENTS

| | | | | |
|---|---|---|---|---|
| 6,481,078 B1* | 11/2002 | Stone | ..... | B62D 65/06 29/252 |
| 7,089,653 B2* | 8/2006 | Kim | ..... | B62D 65/06 269/289 R |
| 2004/0061360 A1* | 4/2004 | Sugiura | ..... | B60J 7/04 296/216.08 |
| 2006/0284450 A1* | 12/2006 | Regnier | ..... | B60J 7/024 296/216.01 |
| 2009/0284049 A1* | 11/2009 | Lee | ..... | B60J 7/022 296/216.04 |

* cited by examiner

*Primary Examiner* — Jermie Cozart
(74) *Attorney, Agent, or Firm* — Quinn Law Group, PLLC

(57) ABSTRACT

In an embodiment, the presently disclosed method for coupling a sunroof assembly to a structural frame of a vehicle includes the following steps: (a) moving a sunroof module and a bond frame of the sunroof assembly through a windshield opening of the structural frame and toward a roof portion of the structural frame; (b) securing the sunroof module to the roof portion of the structural frame; (c) moving a locating fixture downwardly toward the roof portion of the structural frame; (d) inserting the frame pins of the locating fixture in frame pockets of the structural frame; (e) applying a first clamping force to the structural frame and the locating fixture; (f) inserting the sunroof pins of the locating fixture in the sunroof pockets of the bond frame; (g) applying a second clamping force to the bond frame; and (h) securing the bond frame to the sunroof module.

20 Claims, 4 Drawing Sheets

METHOD FOR COUPLING A SUNROOF ASSEMBLY TO A STRUCTURAL FRAME OF A VEHICLE

TECHNICAL FIELD

The present disclosure relates to a method for coupling a sunroof assembly to a structural frame of a vehicle.

BACKGROUND

Some vehicles are designed with a sunroof cooperating with a passenger compartment. Generally, the sunroof includes a glass component that is movable to selectively uncover an opening in the roof of the vehicle. To attach the sunroof to the vehicle, whether in a top load operation or a bottom load operation, the entire sunroof, including a frame and the glass component, are installed in the vehicle as a single unit.

SUMMARY

It is useful to develop a method for coupling a sunroof glass apparatus to a structural frame of a vehicle, wherein the sunroof glass apparatus is larger than the sunroof aperture formed in the roof portion of the structural frame. Instead of installing the entire sunroof assembly, including a frame and a glass component, in the structural frame as a single unit, it is useful to develop a method for coupling a sunroof frame to the bottom of the roof portion of the structural frame and then installing the sunroof glass apparatus from the top of the structural frame of the vehicle. The presently disclosed method allows the coupling of a sunroof glass from above the top of the vehicle (i.e., top loading) to a sunroof assembly that was previously loaded from the underside of the vehicle roof (i.e., bottom load). This method not only enables the attachment of a sunroof glass that is larger than the sunroof aperture to the sunroof assembly but also allows the bond frame of the sunroof assembly to be located in a dimensionally precise manner relative to the structural frame of the vehicle.

In an embodiment, the presently disclosed method for coupling a sunroof assembly to a structural frame of a vehicle includes the following steps: (a) moving a sunroof module and a bond frame of the sunroof assembly through a windshield opening of the structural frame and toward a roof portion of the structural frame, wherein the structural frame has a plurality of frame pockets, and the bond frame has a plurality of sunroof pockets; (b) securing the sunroof module to the roof portion of the structural frame in order to fix a position of the sunroof module relative to the structural frame; (c) moving a locating fixture downwardly toward the roof portion of the structural frame, wherein the locating fixture includes a fixture frame, frame pins coupled to the fixture frame, and sunroof pins coupled to the fixture frame; (d) inserting the frame pins in the frame pockets of the structural frame in order to locate the locating fixture relative to the structural frame along a fore-aft direction; (e) applying a first clamping force to the structural frame and the locating fixture in order to fix a position of the locating fixture relative to the structural frame; (f) inserting the sunroof pins of the locating fixture in the sunroof pockets of the bond frame in order to locate the bond frame relative to the locating fixture; (g) applying a second clamping force to the bond frame in order to fix a position of the bond frame relative to the locating fixture; and (h) securing the bond frame to the sunroof module in order to fix a position of the bond frame relative to the sunroof module.

In another embodiment, the method includes the following steps: (a) securing a sunroof module of the sunroof assembly to a roof portion of the structural frame in order to fix a position of the sunroof module relative to the structural frame while a bond frame of the sunroof assembly is at least partially disposed in a sunroof opening of the structural frame, wherein the structural frame has a plurality of frame pockets, and the bond frame has sunroof pockets; (b) moving a locating fixture downwardly toward the roof portion of the structural frame, wherein the locating fixture includes a fixture frame, frame pins coupled to the fixture frame, and sunroof pins coupled to the fixture frame; (c) inserting the frame pins in the frame pockets of the structural frame in order to locate the locating fixture relative to the structural frame along a fore-aft direction; (d) applying a first clamping force to the structural frame and the locating fixture in order to fix a position of the locating fixture relative to the structural frame; (e) inserting the sunroof pins of the locating fixture in the sunroof pockets of the bond frame in order to locate the bond frame relative to the locating fixture; (f) applying a second clamping force to the bond frame in order to fix a position of the bond frame relative to the locating fixture; and (g) securing the bond frame to the sunroof module in order to fix a position of the bond frame relative to the sunroof module.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above", "below", "upward", "up", "downward", "down", "top", "bottom", "left", "right", "back", "forth", etc., are used descriptively for the figures, and do not represent limitations on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges that can be subject to human error during installation.

Figure 1:
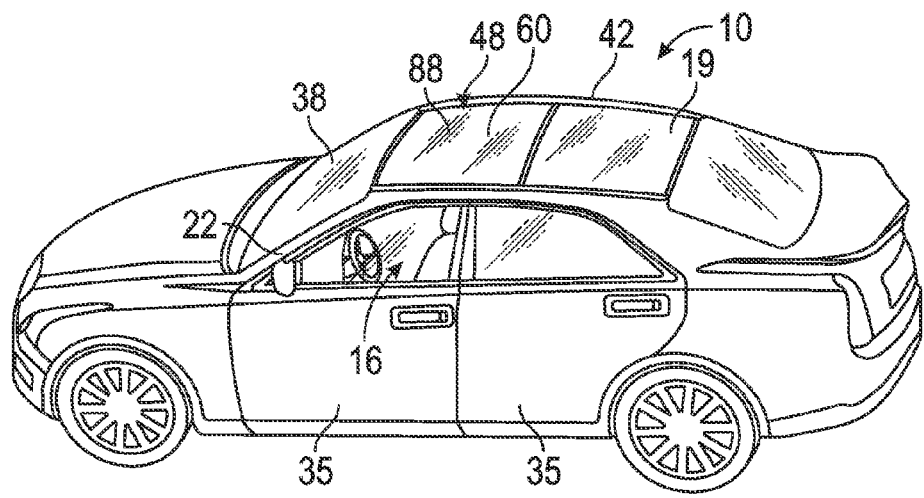
FIG. 1 is a schematic perspective view of a vehicle including a sunroof assembly.

Referring to the Figures, wherein like numerals indicate like or corresponding parts throughout the several views, a vehicle 10 is generally shown in FIG. 1. The vehicle 10 can be an automotive vehicle, such as, a car, a truck, a sport utility vehicle (SUV), etc. It is to be appreciated that the vehicle 10 can alternatively be a non-automotive vehicle.

Figure 3:
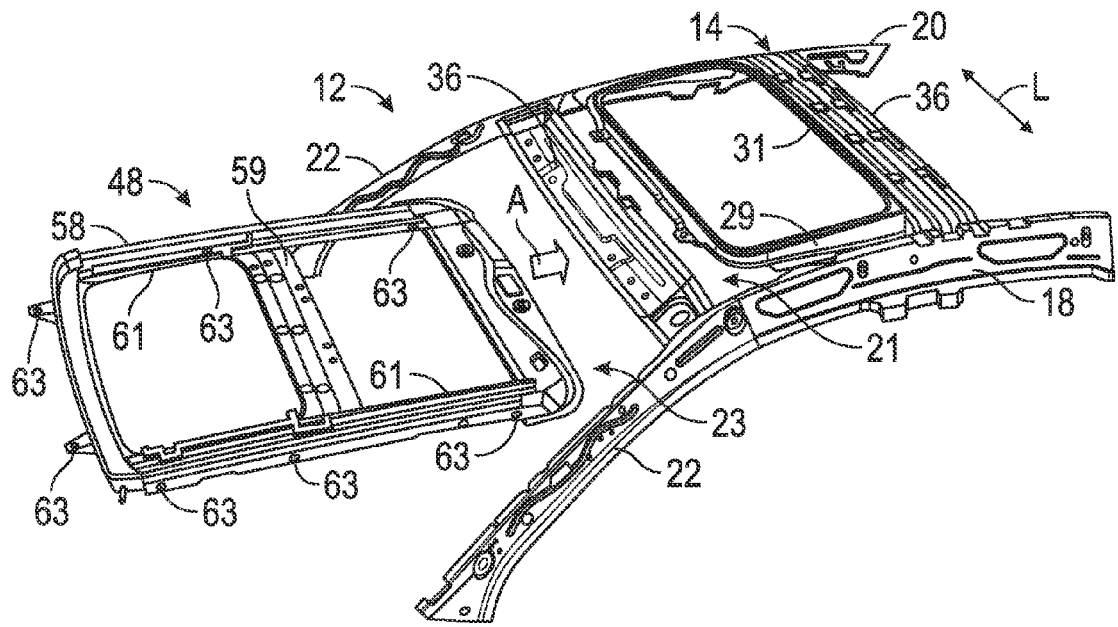
FIG. 3 is a schematic fragmentary perspective view of a structural frame of the vehicle and a sunroof module being loaded through the windshield opening of the structural frame.

As best shown in FIG. 3, the vehicle 10 includes a structural frame 12 having a roof portion 14. The roof portion 14 can include a first roof rail 18 and a second roof rail 20 spaced from each other along a lateral direction indicated by double arrows L (i.e., the cross-car direction). The structural frame 12 can also include A-pillars 22. The structural frame 12 can include one or more braces 36 attached to the first roof rail 18 and the second roof rail 20 to support the sides of the structural frame 12. Further, the structural frame 12 defines a windshield opening 23 between the two A-pillars 22. The windshield opening 23 is configured, shaped, and sized to receive the windshield 38 (FIG. 1) of the vehicle 10. In the depicted embodiment, two A-pillars 22 and at least one brace 36 partially define the windshield opening 23. Furthermore, two braces 36 and the roof rails 18, 20 together define a sunroof opening 21.

With reference again to FIG. 1, the vehicle 10 can include a windshield 38 generally disposed between the A-pillars 22. In particular, the windshield 38 is disposed in the windshield opening 23. In the depicted embodiment, the vehicle 10 has a passenger compartment 16 and one or more doors 35 that provide access to the passenger compartment 16. The doors 35 are movable relative to the structural frame 12 (FIG. 2).

The vehicle 10 further includes a roof panel 42 attached to the roof portion 14 (FIG. 2) of the structural frame 12. Specifically, the roof panel 42 is attached to the first and second roof rails 18, 20 on each side of the vehicle 10. The roof panel 42 further encloses the passenger compartment 16 along the roof portion 14.

Figure 2:
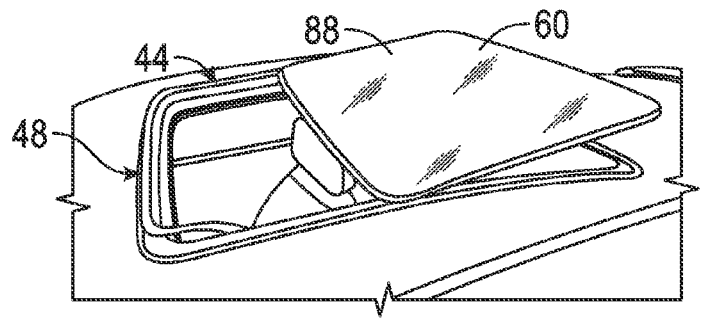
FIG. 2 is a schematic fragmentary perspective view of the vehicle, showing the glass apparatus of the sunroof assembly in an open position.

With reference to FIG. 2, the roof panel 42 defines an aperture 44. The vehicle 10 can also include a sunroof assembly 48 that cooperates with the roof panel 42. Specifically, the sunroof assembly 48 cooperates with the aperture 44 to allow a passenger inside the vehicle 10 to open and close the aperture 44 as desired. It is to be appreciated that the configuration of the sunroof assembly 48 can change to cooperate with roof panels 42 of different configurations. Specifically, the sunroof assembly 48 includes a glass apparatus 60 movable relative to the structural frame 12 between a closed position (FIG. 1) and an open position (FIG. 2). The glass apparatus 60 can be movable automatically or manually. In certain embodiments, a switch or button is depressed to actuate the mechanism (not shown) that moves the glass apparatus 60.

The glass apparatus 60 can include a laminated-vitreous element 88. The laminated-vitreous element 88 can be, for example, laminated glass, polycarbonate, or any other suitable material. The laminated-vitreous element 88 can present a clear appearance or a shaded/tinted appearance. For example, the laminated-vitreous element 88 can be a translucent color (black tint, brown tint, blue tint, etc.) or be transparent/clear (no tint). The glass apparatus 60 is movable relative to the structural frame 12. The vehicle 10 may include a stationary glass apparatus 19 that remains stationary relative to the structural frame 12.

Figure 4:
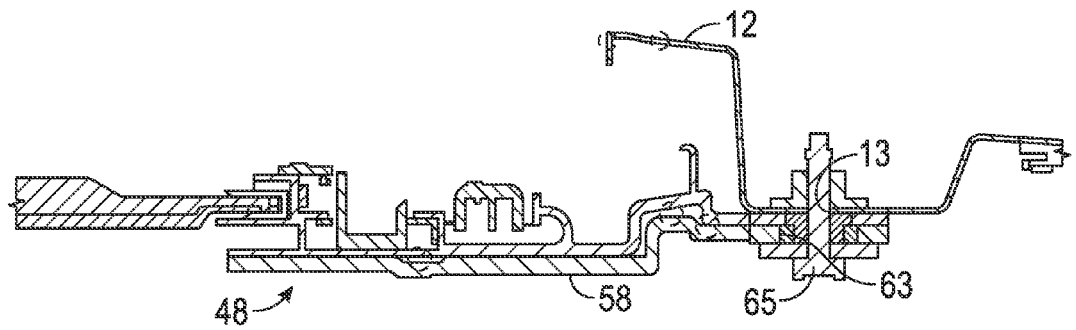
FIG. 4 is a schematic fragmentary cross-sectional view of the structural frame and the sunroof module coupled to the structural frame.

With reference to FIGS. 3 and 4, the sunroof assembly 48 includes a sunroof module 58 and a bond frame 29. The sunroof module 58 can be attached to the structural frame 12, and the bond frame 29 can be attached to the sunroof module 58. The bond frame 29 can be disposed between two braces 36 and the first and second roof rails 18, 20. Further, the bond frame 29 defines the aperture 44. The bond frame 29 can support the glass apparatus 60.

The sunroof module 58 may have a substantially rectangular shape and defines at least one module opening 61. In the depicted embodiment, the sunroof module 58 includes a bracket 59 separating two module openings 61. The sunroof module 58 defines a plurality of fastener holes 63 each configured, shaped, and sized to receive a fastener 65, such as a screw or a bolt. The structural frame 12 also defines frame holes 13 configured, shaped, and sized to receive a fastener 65. In the depicted embodiment, the sunroof module 58 has eight (8) fastener holes 63, and the structural frame 12 also has eight (8) frame holes 13. However, the sunroof module 58 may have more or fewer fastener holes 63, and the structural frame 12 may have more or fewer frame holes 13.

The present disclosure relates to a method for coupling the sunroof assembly 48 to the structural frame 12. In particular, the presently disclosed method facilitates locating the bond frame 29 relative to the sunroof module 58 and the structural frame 12. As shown in FIG. 2, the presently disclosed method begins by loading the sunroof module 58 and the bond frame 29 into the structural frame 12 through the windshield opening 23. To do so, the sunroof module 58 and the bond frame 29 are moved toward the structural frame 12 in the direction indicated by arrow A. The sunroof module 58 and the bond frame 29 should be moved toward the structural frame 12 until the fastener holes 63 of the sunroof module 58 are substantially aligned with the frame holes 13 of the structural frame 12 (as shown in FIG. 4) in order to allow a fastener 65 (FIG. 4) to be inserted through a fastener hole 63 and a frame hole 13. At this point, the sunroof module 58 and the bond frame 29 are at least partially disposed in or underneath the sunroof opening 21. Thus, the sunroof opening 21 is configured, shaped, and sized to at least partly receive the bond frame 29. In turn, the bond frame 29 defines a bond frame opening 31.

With reference to FIG. 4, after substantially aligning the frame holes 13 of the structural frame 12 with the fastener holes 63 of the sunroof module 58, fasteners 65 are inserted through the frame holes 13 and the fastener holes 63 in order to secure the sunroof module 58 to the structural frame 12. The fasteners 65 may be bolts, screws, or any other fastener suitable for coupling the sunroof module 58 to the structural frame 12.

Figure 5:
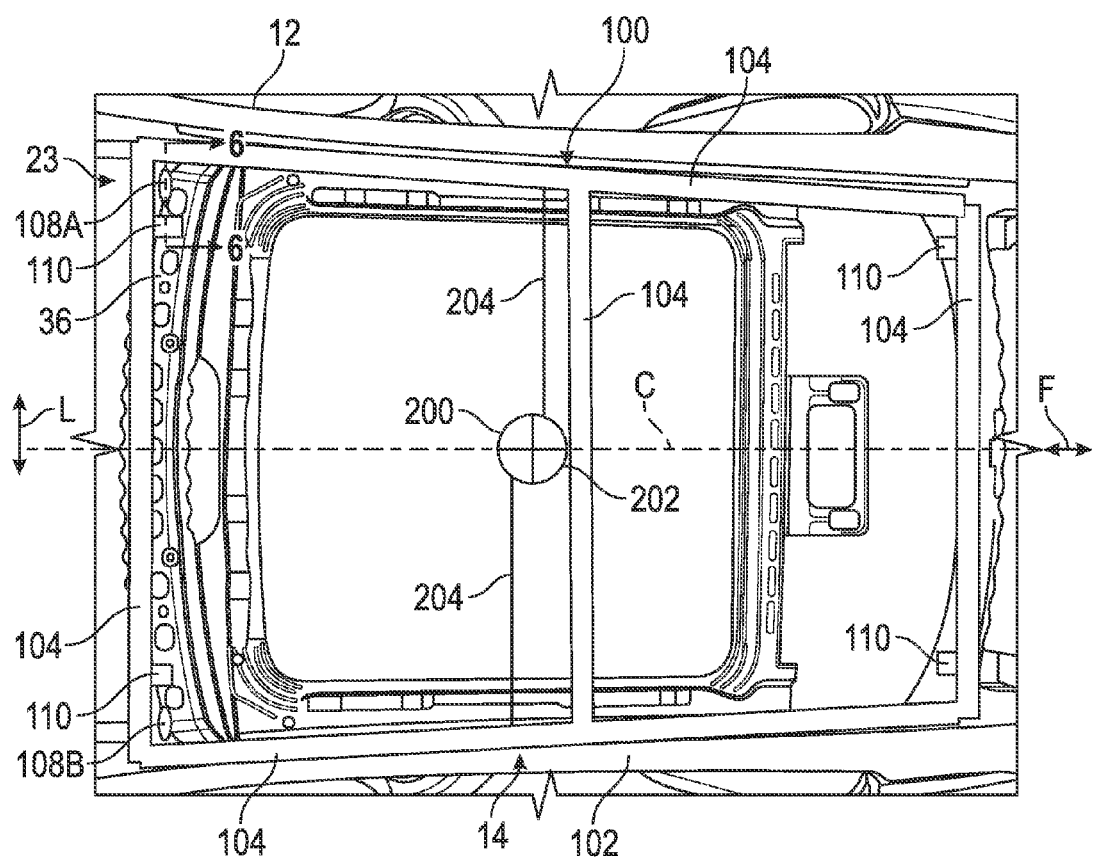
FIG. 5 is a schematic fragmentary top view of a locating fixture over the structural frame of the vehicle.
Figure 6:
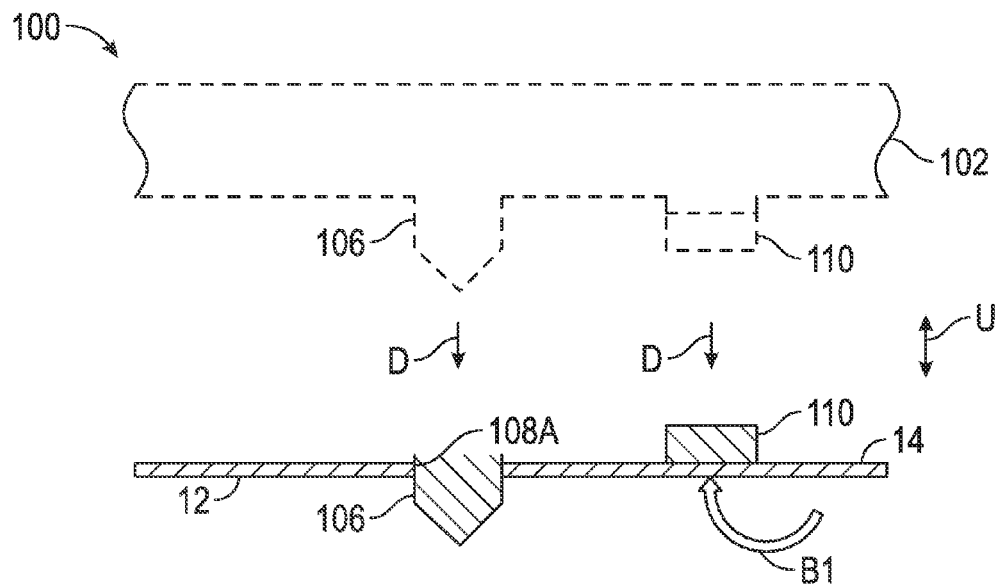
FIG. 6 is a schematic fragmentary cross-sectional view of a locating fixture on top of the structural frame of the vehicle, taken along section line 6-6 of FIG. 5.

With reference to FIGS. 5 and 6, a locating fixture 100 is lowered onto the roof portion 14 of the structural frame 12 from a position above the structural frame 12. The locating fixture 100 includes a fixture frame 102. The fixture frame 102 includes a plurality of fixture bars 104 coupled to one another. In addition, the locating fixture 100 includes a plurality of frame pins 106 (FIG. 6) protruding downwardly from the fixture frame 102. The frame pins 106 are coupled to the fixture frame 102 and, therefore, can move along with the fixture frame 102 in a vertical direction indicated by double arrows U (FIG. 6). The frame pins 106 are configured, shaped, and sized to be disposed in the frame pockets 108A, 108B of the structural frame 12 in order to align the locating fixture 100 along the fore-aft direction indicated by double arrows F. Each of the frame pockets 108A, 108B are configured, sized, and shaped to receive one of the frame pins 106 of the locating fixture 100 in order to locate the locating fixture 100 relative to the structural frame 12 along the vehicle center line C (i.e., along the fore-aft direction indicated by double arrows F). The frame pockets 108A, 108B may be configured as holes, slots, or any suitable opening capable of receiving the frame pins 106. Regardless of their configuration, the frame pockets 108A, 108A are disposed in the roof portion 14 of the structural frame 12. In the depicted embodiment, the frame pockets 108A, 108B are formed in the brace 36 that is closest to the windshield opening 23. However, it is contemplated that the frame pockets 108A, 108B may be in other parts of the roof portion 14. Irrespective of their specific location in the structural frame 12, the frame pockets 108A, 108B are spaced apart from each other along a lateral direction indicted by double arrows L and serve as fore-aft datum targets for the frame pins 106 as discussed in detail below. The lateral direction indicated by arrow L may also be referred to as a cross-car direction. The lateral direction indicated by double arrows L is substantially perpendicular to the fore-aft direction indicated by double arrows F and the vehicle center line C. In the depicted embodiment, the structural frame 12 has two of the frame pockets 108A, 108B, and the locating fixture 100 includes two of the frame pins 106. However, the structural frame 12 may have more than two of the frame pockets 108A, 108B, and the locating fixture 100 may include more than two of the frame pins 106.

Aside from the frame pins 106, the locating fixture 100 includes a plurality of frame pads 110 coupled to the fixture frame 102. The frame pads 110 serve as locators in order to locate the locating fixture 100 relative to the structural frame 12 along the vertical direction (up/down directions) as indicated by double arrows U (FIG. 6). Because the frame pads 110 are coupled to the fixture frame 102, the frame pads 110 can also move along the vertical direction indicated by double arrows U (FIG. 6). In the depicted embodiment, the locating fixture 100 includes four of the frame pads 110 coupled to the fixture frame 102. However, it is contemplated that the locating fixture 100 may include more or fewer of the frame pads 110.

With continued reference to FIGS. 5 and 6, the locating fixture 100 is lowered onto the roof portion 14 of the structural frame 12 from a position above the structural frame 12. As the locating fixture 100 is lowered, the frame pins 106 and the frame pads 110 move downwardly toward the roof portion 14 of the structural frame 12 in the direction indicated by arrows D. The frame pins 106 and the frame pads 110 can move simultaneously toward the structural frame 12. The locating fixture 100 should be moved toward the roof portion 14 until the frame pins 106 are disposed inside the frame pockets 108A, 108B and the frame pads 110 are disposed on the roof portion 14 of the structural frame 12.

Before, after, or while inserting the frame pins 106 in the frame pockets 108A, 108B and placing the frame pads 110 on top of the roof portion 14, the locating fixture 100 is centered along the vehicle center line C. A centering device 200 can be used to center the locating fixture 100 along the vehicle center line C. Specifically, the centering device 200 includes a device body 202 and at least two legs 204 extending from the device body 202. The legs 204 of the centering device 200 can push the sides of the structural frame 12 in order to align the locating fixture 100 along the vehicle center line C. In other words, the centering device 200 can push against the sides of the structural frame 12 in order to center the locating fixture 100 in relation to the structural frame 12.

After centering the locating fixture 100 and inserting the frame pins 106 in the frame pockets 108A, 108B, the locating fixture 100 is secured to the structural frame 12. To do so, a clamping force B1 can be applied to the structural frame 12 and the locating fixture 100 in order to fix the position of the locating fixture 100 relative to the structural frame 12. A clamp can be used to apply the clamping force B1 to the locating fixture 100 and the structural frame 12. The clamping force B1 may be referred to as the first clamping force.

Figure 7:
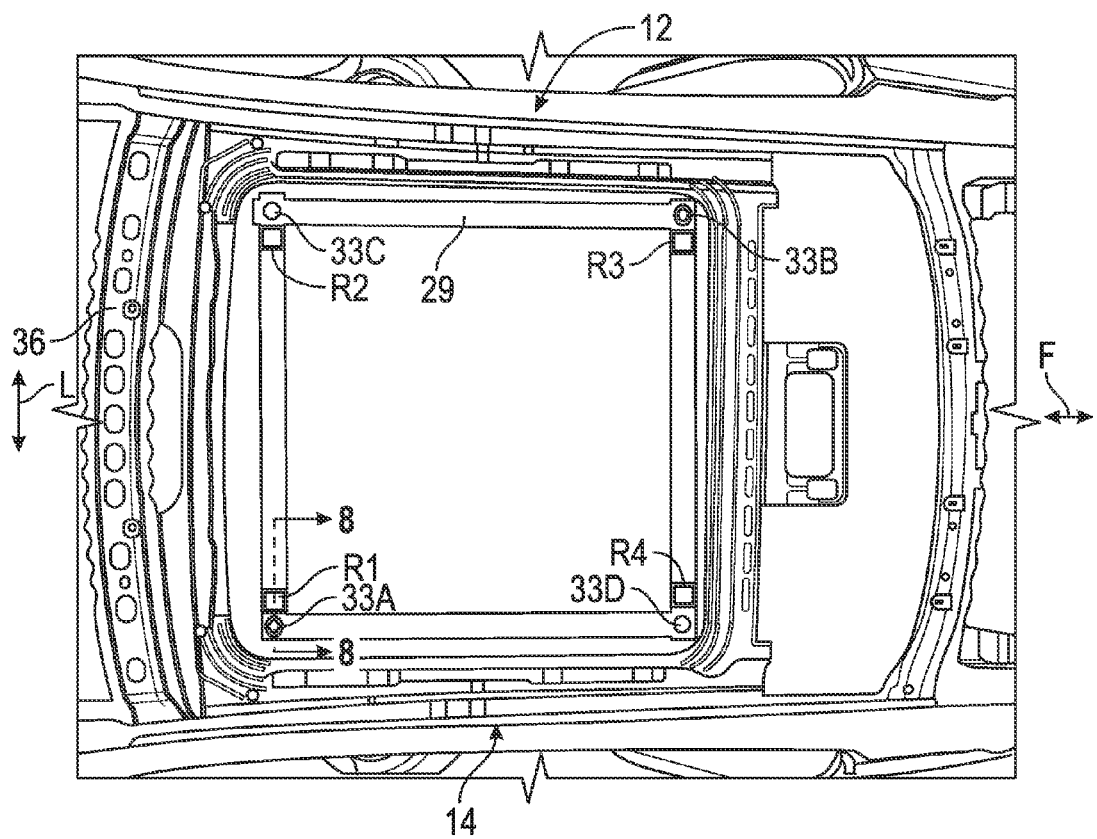
FIG. 7 is a schematic fragmentary top view of the structural frame and a bond frame of the sunroof assembly.
Figure 8:
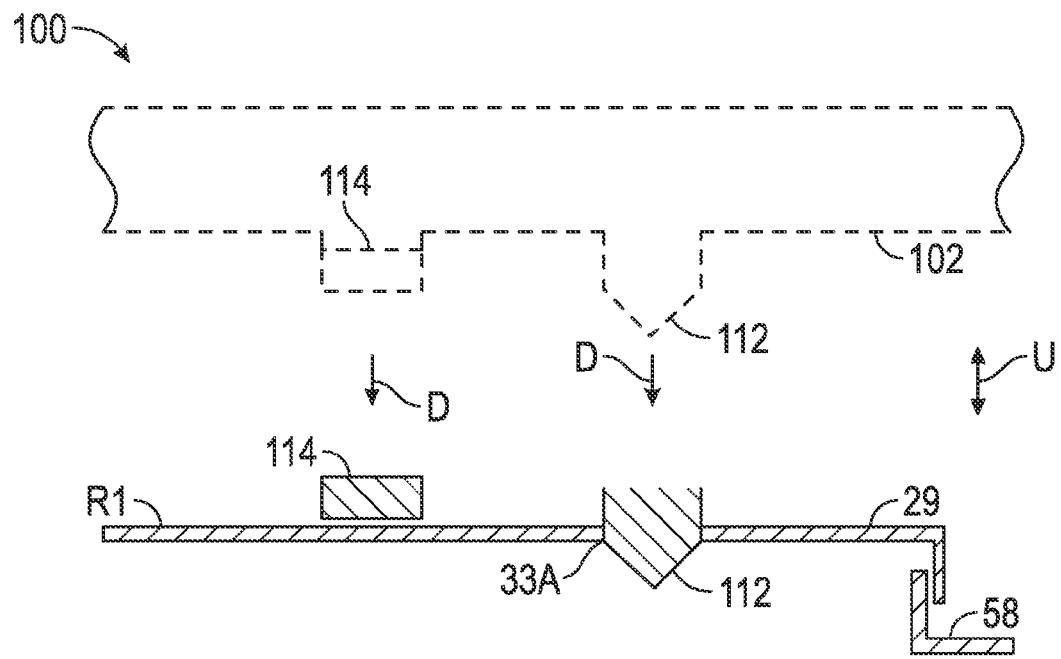
FIG. 8 is a schematic fragmentary cross-sectional view of the structural frame and the sunroof pins and sunroof pads of the locating fixture moving toward the structural frame, taken along section line 8-8 of FIG. 7.

With reference to FIGS. 7 and 8, after the locating fixture 100 is secured to the structural frame 12, the locating fixture 100 locates the bond frame 29 relative to the structural frame 12. The bond frame 29 defines a plurality of sunroof pockets 33A, 33B, and the locating fixture 100 includes a plurality of sunroof pins 112 configured, shaped, and sized to be received in the sunroof pockets 33A, 33B. In the depicted embodiment, the bond frame 29 has two sunroof pockets 33A, 33B, and the structural frame 12 has two sunroof pins 112. However, it is contemplated that the bond frame 29 may have more sunroof pockets 33A, 33B, and the structural frame 12 may have more sunroof pins 112. Regardless of the quantity, each sunroof pocket 33A, 33B is configured, shaped, and sized to receive one of the sunroof pins 112 of the locating fixture 100. Further, the sunroof pockets 33A, 33B are spaced apart from each other along the lateral direction indicated by double arrows L and the fore-aft direction indicated by double arrows F. Moreover, the sunroof pockets 33A, 33B serve as cross-car and fore-aft datum targets for the sunroof pins 112 of the locating fixture 100 as discussed in detail below. The bond frame 29 may include additional sunroof pockets 33C and 33D to locate the glass apparatus 60 relative to the bond frame 29 until an adhesive used to bond the bond frame 29 to the glass apparatus 60 cures.

The locating fixture 100 also has sunroof pads 114 configured to be placed on the bond frame 29 at locations R1, R2, R3, and R4 (FIG. 6) as discussed in detail below. The sunroof pads 114 can be movably coupled to the fixture frame 102. The locations R1, R2, R3, and R4 of the bond frame 29 are up/down datum targets for the sunroof pads 114 of the locating fixture. The sunroof pads 114 of the locating fixture 100 are used to locate the bond frame 29 relative to the sunroof module 58 and the structural frame 12 as discussed below.

In the presently disclosed method, the sunroof pins 112 and the sunroof pads 114 move downwardly toward the bond frame 29 in the direction indicated by arrows D as shown in FIG. 8. The sunroof pins 112 can be movably coupled to the fixture frame 102. The locating fixture 100 should be moved toward the bond frame 29 until the sunroof pins 112 of the locating fixture 100 are disposed inside the sunroof pockets 33A, 33B and the sunroof pads 114 are disposed over the bond frame 29. In particular, the sunroof pads 114 are moved toward the bond frame 29 until the sunroof pads 114 are located over the bond frame 29 at locations R1, R2, R3, and R3. At this juncture, the sunroof pads 114 are not necessarily contacting the bond frame 29. The sunroof pins 112 and the sunroof pads 114 can move simultaneously toward the bond frame 29.

Figure 9:
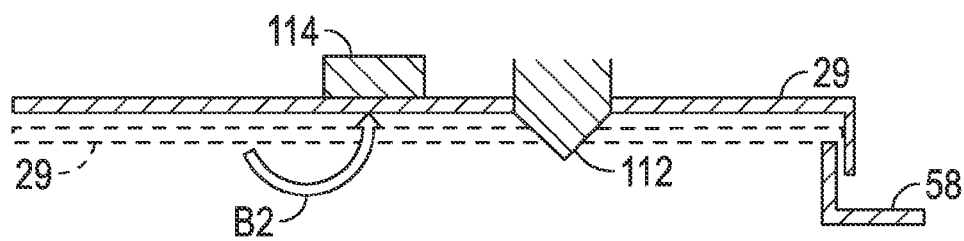
FIG. 9 is a schematic fragmentary cross-sectional view of the structural frame and the locating fixture being clamped together.

Next, with specific reference to FIG. 9, a clamping force B2 can be applied to the bond frame 29 and the locating fixture 100 in order to move the bond frame 29 toward the sunroof pads 114 and fix the position of the locating fixture 100 relative to the bond frame 29. At this juncture, the sunroof pads 114 can contact the bond frame 29 at the locations R1, R2, R3, and R4. A clamp can be used to apply the clamping force B2 to the locating fixture 100 and the bond frame 29. The clamping force B2 may be referred to as the second clamping force.

Figure 10:
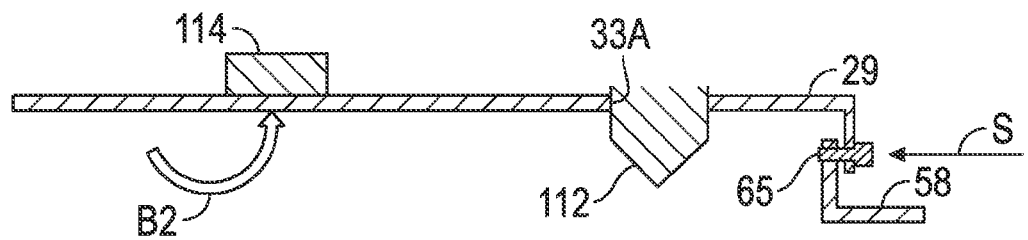
FIG. 10 is a schematic fragmentary cross-sectional view of the sunroof module being coupled to the structural frame.

With reference to FIG. 10, the bond frame 29 can be secured to the sunroof module 58 while the sunroof pads 114 are contacting the bond frame 28, the sunroof pins 112 are disposed inside the sunroof pockets 33A, 33B, 33C, 33D and the clamping force B2 is being applied to the bond frame 29. The bond frame 29 can be secured to the sunroof module 58 with fasteners 65, such as screws and bolts. For example, the fasteners 65 can be inserted through the sunroof module 58 and the bond frame 29 at opposite sides of the bond frame 29 in order to secure the bond frame 29 to the sunroof module 58. The fasteners 65 can be advanced toward the bond frame 29 in the direction indicated by arrow S. After the sunroof module 58 is secured to the bond frame 29, the locating fixture 100 can be withdrawn from the bond frame 29. Specifically, the locating fixture 100 (along with the sunroof pads 114 and the sunroof pins 112) can be moved away from the bond frame 29 after the clamping forces B1, B2 have been released from the bond frame 29 and the structural frame 12. The glass apparatus 60 (FIG. 1) can then be lowered toward the roof portion 14 of the structural frame 12 and coupled to the sunroof module 58.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for coupling a sunroof assembly to a structural frame of a vehicle, the method comprising:
    moving a sunroof module and a bond frame of the sunroof assembly through a windshield opening of the structural frame and toward a roof portion of the structural frame, wherein the structural frame has a plurality of frame pockets, and the bond frame has a plurality of sunroof pockets;
    securing the sunroof module to the roof portion of the structural frame in order to fix a position of the sunroof module relative to the structural frame;
    moving a locating fixture downwardly toward the roof portion of the structural frame;
    inserting frame pins in the frame pockets of the structural frame in order to locate the locating fixture relative to the structural frame along a fore-aft direction;
    applying a first clamping force to the structural frame and the locating fixture in order to fix a position of the locating fixture relative to the structural frame;
    inserting sunroof pins of the locating fixture in the sunroof pockets of the bond frame in order to locate the bond frame relative to the locating fixture;
    applying a second clamping force to the bond frame in order to fix a position of the bond frame relative to the locating fixture; and
    securing the bond frame to the sunroof module in order to fix a position of the bond frame relative to the sunroof module.

2. The method of claim 1, wherein the locating fixture includes a fixture frame, the frame pins that are coupled to the fixture frame, the sunroof pins that are coupled to the fixture frame, and frame pads coupled to the fixture frame, and the method further includes placing the frame pads on the roof portion of the structural frame in order to locate the locating fixture relative to the structural frame along a vertical direction, and the vertical direction is perpendicular to the fore-aft direction.

3. The method of claim 2, wherein the locating fixture includes sunroof pads coupled to the fixture frame, and the method further includes moving the sunroof pads of the locating fixture toward the bond frame.

4. The method of claim 3, wherein applying the second clamping force includes moving the bond frame toward the sunroof pads such that the sunroof pads contact the bond frame.

5. The method of claim 4, wherein inserting the sunroof pins of the locating fixture in the sunroof pockets and moving the sunroof pads of the locating fixture toward the bond frame are performed simultaneously.

6. The method of claim 5, wherein inserting the frame pins in the frame pockets and placing the frame pads on the roof portion of the structural frame are performed simultaneously.

7. The method of claim 1, further comprising releasing the first clamping force and the second clamping force and then withdrawing the locating fixture from the structural frame.

8. The method of claim 1, further comprising centering the locating fixture along a vehicle center line.

9. The method of claim 1, wherein the sunroof module is secured to the roof portion of the structural frame by inserting fasteners through the sunroof module and the structural frame.

10. The method of claim 1, wherein the bond frame is secured to the sunroof module by inserting fasteners through the sunroof module and the bond frame.

11. The method of claim 1, wherein at least two of the frame pockets are spaced apart from each other along a cross-car direction.

12. The method of claim 11, wherein at least two of the sunroof pockets are spaced apart from each other along the cross-car direction and the fore-aft direction, the fore-aft direction is perpendicular to the cross-car direction.

13. A method for coupling a sunroof assembly to a structural frame of a vehicle, the method comprising:
    securing a sunroof module of the sunroof assembly to a roof portion of the structural frame in order to fix a position of the sunroof module relative to the structural frame while a bond frame of the sunroof assembly is at least partially disposed in a sunroof opening of the structural frame, wherein the structural frame has a plurality of frame pockets, and the bond frame has sunroof pockets;
    moving a locating fixture downwardly toward the roof portion of the structural frame, wherein the locating fixture includes a fixture frame, frame pins coupled to the fixture frame, and sunroof pins coupled to the fixture frame;
    inserting the frame pins in the frame pockets of the structural frame in order to locate the locating fixture relative to the structural frame along a fore-aft direction;
    applying a first clamping force to the structural frame and the locating fixture in order to fix a position of the locating fixture relative to the structural frame;
    inserting the sunroof pins of the locating fixture in the sunroof pockets of the bond frame in order to locate the bond frame relative to the locating fixture;
    applying a second clamping force to the bond frame in order to fix a position of the bond frame relative to the locating fixture; and
    securing the bond frame to the sunroof module in order to fix a position of the bond frame relative to the sunroof module.

14. The method of claim 13, further comprising moving the sunroof module and the bond frame through a windshield opening of the structural frame and toward the roof portion of the structural frame before securing the sunroof module to the structural frame.

15. The method of claim 13, wherein the locating fixture includes frame pads coupled to the fixture frame, and the method further includes placing the frame pads on the roof portion of the structural frame in order to locate the locating fixture relative to the structural frame along a vertical direction, and the vertical direction is perpendicular to the fore-aft direction.

16. The method of claim 13, wherein the locating fixture includes sunroof pads coupled to the fixture frame, and the method further includes moving the sunroof pads of the locating fixture toward the bond frame.

17. The method of claim 16, wherein applying the second clamping force includes moving the bond frame toward the sunroof pads such that the sunroof pads contact the bond frame.

18. The method of claim 13, further comprising releasing the first clamping force and the second clamping force and then withdrawing the locating fixture from the structural frame.

19. The method of claim 13, further comprising centering the locating fixture along a vehicle center line.

20. The method of claim 13, wherein the sunroof module is secured to the roof portion of the structural frame by inserting fasteners through the sunroof module and the structural frame.

* * * * *